United States Patent
Bassi et al.

(10) Patent No.: US 12,452,260 B2
(45) Date of Patent: Oct. 21, 2025

(54) APPARATUSES, COMPUTER-IMPLEMENTED METHODS, AND COMPUTER PROGRAM PRODUCTS FOR IMPROVED REMOTE ACCESS CYBERSECURITY BASED ON QUARANTINING REMOTE ACTION DATA AND GENERATING MALICIOUS DETERMINATION DATA

(71) Applicant: Honeywell International Inc., Charlotte, NC (US)

(72) Inventors: Atul Bassi, Bengaluru (IN); Tarun Gupta, Bengaluru (IN); Eli Abramson, Ramat-Gan (IL)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 283 days.

(21) Appl. No.: 18/187,126

(22) Filed: Mar. 21, 2023

(65) Prior Publication Data
US 2024/0323199 A1 Sep. 26, 2024

(51) Int. Cl.
*H04L 9/40* (2022.01)
*G06F 21/55* (2013.01)
*G06F 21/53* (2013.01)
*G06F 21/56* (2013.01)

(52) U.S. Cl.
CPC ...... *H04L 63/1416* (2013.01); *H04L 63/1441* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,448,072 B1* | 5/2013 | Lai | G06Q 10/107 715/753 |
| 12,207,120 B2* | 1/2025 | Miao | H04W 24/10 |
| 2005/0015624 A1* | 1/2005 | Ginter | H04L 63/145 726/4 |
| 2007/0050777 A1* | 3/2007 | Hutchinson | G06F 11/0781 718/104 |

(Continued)

OTHER PUBLICATIONS

Remote Monitoring and Maintenance for Equipment and Production Lines on Industrial Internet: A Literature Review. Li. (Year: 2022).*

(Continued)

*Primary Examiner* — Venkat Perungavoor
(74) *Attorney, Agent, or Firm* — ALSTON & BIRD LLP

(57) ABSTRACT

Embodiments of the present disclosure provide for remote access of a device, for example an operational technology device or an information technology device, in a manner with improved cybersecurity. Some embodiments receive remote action data from a client device in response to an initiated remote access action of the remote action data from the client device to a remotely accessible device, quarantine the remote action data from the client device, generate malicious determination data indicating whether the remote action data is determined as malicious by processing the remote action data, and determine whether to block transfer of the remote action data to the remotely accessible device based at least in part on the malicious determination data.

19 Claims, 9 Drawing Sheets

(56) References Cited

U.S. PATENT DOCUMENTS

| | | | | |
|---|---|---|---|---|
| 2009/0271504 | A1* | 10/2009 | Ginter | H04L 63/02 |
| | | | | 709/220 |
| 2012/0266209 | A1* | 10/2012 | Gooding | H04L 63/20 |
| | | | | 726/1 |
| 2017/0118228 | A1 | 4/2017 | CP et al. | |
| 2020/0074336 | A1 | 3/2020 | Saxe et al. | |
| 2021/0029029 | A1* | 1/2021 | Mehmedagic | H04L 67/125 |
| 2022/0141662 | A1* | 5/2022 | Liao | H04W 12/37 |
| | | | | 726/1 |
| 2024/0356901 | A1* | 10/2024 | Spillman | H04L 63/0218 |
| 2025/0030715 | A1* | 1/2025 | Comay | H04L 63/1425 |

OTHER PUBLICATIONS

Anatomy of Threats to the Internet of Things. Makhdoom. (Year: 2019).*
Survey on Multi-Access Edge Computing for Internet of Things Realization. Porambage. IEEE. (Year: 2018).*
Extended European Search Report Mailed on Apr. 10, 2024 for EP Application No. 24160052, 7 page(s).
EP Office Action Mailed on Feb. 24, 2025 for EP Application No. 24160052, 6 page(s).

* cited by examiner

APPARATUSES, COMPUTER-IMPLEMENTED METHODS, AND COMPUTER PROGRAM PRODUCTS FOR IMPROVED REMOTE ACCESS CYBERSECURITY BASED ON QUARANTINING REMOTE ACTION DATA AND GENERATING MALICIOUS DETERMINATION DATA

TECHNICAL FIELD

Embodiments are generally directed to providing enhanced cybersecurity protection in information technology (IT) and/or operational technology (OT) networks, and specifically to providing enhanced cybersecurity protection during remote access of OT devices.

BACKGROUND

In various contexts, it is desirable to remotely access a device over a communications network. For example, a device may be accessible to enable data transfer from the device to an external device for monitoring. Additionally, it may be necessary or desirable to expose the device to remote transfer of data for purposes of performing remote device maintenance, configuration updating and/or upgrading, and/or the like.

Applicant has discovered problems and/or other inefficiencies with current implementations for providing cybersecurity for a remote device. Through applied effort, ingenuity, and innovation, Applicant has solved many of these identified problems by developing solutions embodied in the present disclosure, which are described in detail below.

BRIEF SUMMARY

In one aspect, a computer-implemented method is provided. An example computer-implemented method includes receiving remote action data from a client device in response to an initiated remote access action of the remote action data from the client device to a remotely accessible device, quarantining the remote action data from the client device, generating malicious determination data indicating whether the remote action data is determined as malicious by processing the remote action data, and determining whether to block transfer of the remote action data to the remotely accessible device based at least in part on the malicious determination data.

The computer-implemented method may also include where determining whether to block the transfer of the remote action data to the remotely accessible device based at least in part on the malicious determination data includes determining that the malicious determination data indicates that the remote action data is not malicious, and in response to the determination, automatically transmitting the remote action data to the remotely accessible device.

The computer-implemented method may also include where determining whether to block the transfer of the remote action data to the remotely accessible device based at least in part on the malicious determination data includes determining that the malicious determination data indicates that the remote action data is malicious, and in response to the determination, automatically blocking transmission of the remote action data to the remotely accessible device.

The computer-implemented method may also include where generating the malicious determination data includes determining a site location associated with the remotely accessible device, identifying a logic policy corresponding to the site location, and processing the remote action data based at least in part on the logic policy.

The computer-implemented method may also include where generating the malicious determination data includes identifying a logic policy corresponding to the remotely accessible device, and processing the remote action data based at least in part on the logic policy.

The computer-implemented method may also include where generating the malicious determination data includes determining an enterprise identifier corresponding to the remotely accessible device, identifying a logic policy corresponding to the enterprise identifier, and processing the remote action data based at least in part on the logic policy.

The computer-implemented method may further include generating an audit log includes data indicative of at least a timestamp associated with the initiated remote access action, the client device, and the remotely accessible device.

The computer-implemented method may also include where processing the remote action data includes comparing the remote action data with a file database.

The computer-implemented method may also include where processing the remote action data includes applying the remote action data to a rules set.

The computer-implemented method may also include where processing the remote action data includes applying the remote action data to a maliciousness heuristics model.

The computer-implemented method may also include where the remote action data includes a file copied from the client device.

The computer-implemented method may also include where the remote action data includes clipboard text data copied from the client device.

The computer-implemented method may also include where the remotely accessible device includes an operational technology device.

The computer-implemented method may further include causing rendering of a user interface depicting a video of recorded display data across a defined timeseries, where the user interface is specially configured to indicate a point in the defined timeseries at which the remote access action was initiated.

The computer-implemented method may further include causing rendering of a user interface depicting a video of recorded display data across a defined timeseries, and automatically configuring the user interface to seek to a particular point in the defined timeseries based at least in part on a timestamp associated with the initiated remote access action.

The computer-implemented method may further include transmitting a notification to an administrator device that indicates that the transmission of the remote action data was blocked.

The computer-implemented method may also include where the notification is engageable to revoke the blocking transmission of the remote action data to the remotely accessible device.

The computer-implemented method may also include where processing the remote action data includes determining that the clipboard text data represents malicious code or malicious text.

In another aspect of the disclosure, an apparatus is provided. One example apparatus includes at least one processor and at least one memory having computer-coded instructions stored thereon that, in execution with the at least one processor, causes the apparatus to perform any one of the example computer-implemented methods described herein.

In another aspect of the disclosure, a computer program product is provided. One example computer program product comprises at least one non-transitory computer-readable storage medium, the non-transitory computer-readable storage medium including instructions that, when executed by at least one processor, configure the at least one processor to perform any one of the example computer-implemented methods described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
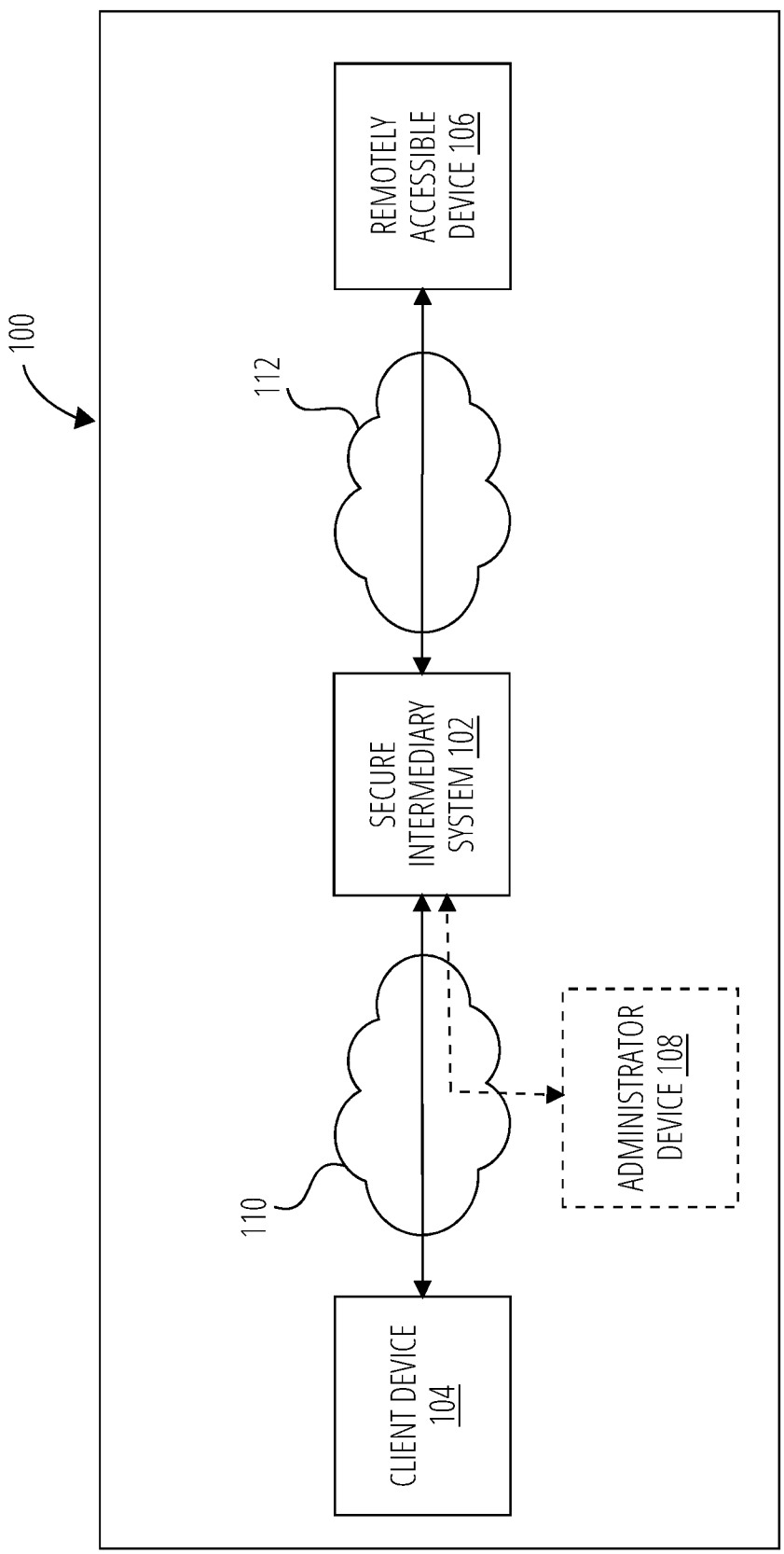
FIG. 1 illustrates an example system in which embodiments of the present disclosure may operate.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

As technologies advance, use of computing devices remotely accessible via a network has increased in prevalence through many use cases. In the context of industrial control systems, resistance to such remotely accessible devices has existed due to the secured nature of such control. In recent deployments, however, remotely accessible devices have been utilized within such industrial control systems to provide individual users, external contractor(s), and/or third-party vendors access to such devices for maintenance, monitoring, and/or the like by leveraging the industrial Internet-of-things (IIoT) implementations. Such IIOT enables the industrial plants to operate in a manner that is smarter, more agile, and otherwise provides various efficiencies for such entities that leverage IIoT. For example, such remote access enables vendors to access the remotely accessible device to routinely, and from afar, provide routine maintenance, handle unplanned activities, provide rapid response to certain incidents, and/or handle potential cybersecurity threat(s) and/or breaches.

Entities choosing to leverage such IIoT implementations have chosen to do so at the expense of increased cybersecurity vulnerability. For example introduction of such remotely accessible device(s) to industrial control systems expose such systems to new external cybersecurity risks not traditionally faced in such systems that remain disconnected from remote access. In this regard, factories, manufacturing facilities, and the like that introduce such remotely accessible devices face additional risks to their operations, data security, and/or the like, caused by the introduction of such remotely accessible devices. While existing solutions may be implemented in an attempt to mitigate or eliminate such risks, such solutions are often ineffective or limited to protection of IT infrastructure and do not satisfactorily function for protection of networks having OT devices or protection of the OT devices themselves.

In one example use case, often entities enable transmission/copying of data to a remotely accessible device as part of remote maintenance activities. The unsecure nature of data transfer, however, is vulnerable to and lead to the spread of malicious activities in IT/OT networks during such maintenance. For example, use of remote equipment for maintenance and/or handling unplanned activities in an OT/IT network by third-party vendors may include firmware transfer of embedded applications, patches, hardening, file transfers, controller firmware updates and/or downgrades, controller troubleshooting, engineering system maintenance, log collection, and/or the like, and/or performance investigations may include investigations into sudden production drops, potential detected cybersecurity threats, and/or the like. Commercially available or other existing technologies provide no safeguards to prevent use of the functionality available these external entities from being misused by such entities or other malicious actors. Thus, such systems remain vulnerable to the risks associated with such technologies for accessing remotely accessible device(s).

Embodiments of the present disclosure provide for improved remote access operations. Specifically, embodiments of the present disclosure provide for secured remote access operations to be performed. Such remote access operations include transfer of files or other data between a client system and a remotely accessible device. Some embodiments utilize a secure intermediary system that enables the secured remote access operations. Specifically, the secure intermediary system may embody an intermediary between the communication that conventionally occurs between the client device and the remotely accessible device directly. The secure intermediary system is specially configured to perform one or more operation(s) that confirm the security of a particular action and data associated therewith, for example to prevent malicious actions and/or spreading of malicious data via such actions. The secure intermediary system may perform a determination that enables a requested action to either be blocked based on the results of the determination, or permitted to continue based on the results of the determination. Additionally or alternatively, the secure intermediary system may provide any number of logging, data storage, and/or related auditing functionality associated with requested actions, the data associated therewith, and/or the results associated with such actions (e.g., whether they were successfully completed, blocked, and/or the like).

In this regard, embodiments of the present disclosure are technically advantageous in a myriad of manners. Embodiments of the present disclosure resolve the technical problems identified herein with respect to securing the remote accessing operations associated with remotely accessible devices. For example, the secure intermediary system may receive remote action data requested for transmission to at least one remotely accessible device, and scan or otherwise process the remote action data to accurately determine whether transfer of such data represents a malicious action that should be blocked, or is permissible to allow to continue without cybersecurity risks. Such embodiments reduce or entirely prevent the spread of malicious data and/or the effects of malicious actions on device(s) and/or system(s) including such device(s) that would otherwise remain vulnerable to such risks. Further still, embodiments of the present disclosure enable improved determination of malicious actions and triggering of improved customized operations associated therewith, for example to initiate appropriate remedial actions (e.g., notifications, data quarantining, and/or the like). Additionally or alternatively still, embodiments of the present disclosure provide for improved data auditability and traceability, improved data visualization and rendering of user interfaces for investigating requested action(s) and/or data associated therewith.

Definitions

"Administrator device" refers to one or more computing device(s) embodied in hardware, software, firmware, and/or a combination thereof, that is configured to enable revocation of a block of transmission of data to a remotely accessible device and/or maintain a block of transmission of data to a remotely accessible device.

"Audit log" refers to electronically managed data that represents an action performed by a system. Non-limiting examples of an audit log include a data object, a record in a data repository, or a data structure that includes data associated with a timestamp at which a remote access action is initiated, a computing entity that initiated the remote access action, and/or a computing entity intended to receive data via the remote access action . . . .

"Client device" refers to one or more computing device(s) embodied in hardware, software, firmware, and/or a combination thereof, that is configured to enable initiation of a remote access action of data from the computing device(s) to at least one remotely accessible device.

"Remote action data" refers to electronically managed data that is initiated for transfer from a particular computing device to a second computing device embodying a remotely accessible device. In some contexts remote action data is determinable as malicious or not malicious.

"Remote access action" and "remote access operation" refer to a computer-implemented process that requests transfer of particular data from a client device to at least one remotely accessible device. In some contexts remote access action is determinable as malicious or not malicious.

"Defined timeseries" refers to a range of timestamps at one or more level(s) of granularity.

"Enterprise identifier" refers to electronically managed data that uniquely represents a particular entity that owns, controls, or otherwise is associated with management of one or more remotely accessible device(s). Non-limiting examples of an enterprise identifier include alphanumeric data, a string, numerical data, or a custom object that uniquely represents a business entity.

"File data" refers to electronically managed data embodying or including a file accessible to a particular computing device.

"Secure intermediary system" refers to one or more computing device(s) configured to receive remote action data from a client device, and process the remote action data to continue a transfer of the remote action data to at least one remotely accessible device or initiate a block of the remote action data to at least one remotely accessible device.

"Logic policy" refers to one or more computer-coded instruction(s) or executable logic that determines data indicating whether particular remote action data is indicated malicious or not malicious.

"Malicious" refers to impermissible computer-driven action or data. A particular action may be malicious based on any data associated with or manipulated by the action. For example, a remote access action in one example may be malicious based on transferring of malicious data, and in another example may be malicious based on transferring of data to a particular computing device to which the data is not permitted to be transferred. In some examples, data is malicious if it is not permissible to transfer such data to particular computing device(s) or any computing device.

"Malicious code" refers to electronically managed data representing computer-executable code, or text that represents computer-executable code, that is determined malicious.

"Malicious determination data" refers to electronically managed data having a data value that indicates whether particular corresponding data is malicious or not malicious. Non-limiting examples of malicious determination data includes a Boolean, a bit flag, a data flag, text data indicating "malicious" or "not malicious," and a reserved data value corresponding to malicious or a reserved data value corresponding to not malicious.

"Malicious text" refers to electronically managed data representing a string, character, or other text that is determined malicious.

"Maliciousness heuristics model" refers to an algorithmic, statistical, or machine learning model that enables generation of malicious determination data "Notification" refers to electronically managed data that is renderable to a computing device that indicates information corresponding to a remote action data determined associated with a malicious determination.

"Operational technology device" refers to any one or more computing device(s) embodied in hardware, software, firmware, and/or any combination thereof, that controls operation of the computing device(s), controls operation of a system associated with the computing device(s), monitors operation of the computing device(s), or monitors operation of the system associated with the computing device(s). Non-limiting examples of an operational technology device include industrial plant sensor(s), camera(s), network device(s), and processing unit(s) that perform a particular process or sub-operation(s) thereof.

"Recorded display data" refers to electronically managed data that represents at least a captured representation of data outputted for rendering to a particular display of a computing device. Recorded display data optionally includes rendered user interface(s) and peripheral or other user engagements with the user interface.

"Remotely accessible device" refers to at least one computing device embodied in hardware, software, firmware, or any combination thereof, that is communicable over a communications network to at least facilitate transferring of data to the computing device(s) from a client device via the communications network.

"Rules set" refers to one or more structure(s) and/or one or more data object(s) that embody any number of functions of computational logic that determine whether a remote access action of particular remote action data is malicious or not malicious.

"Site location" refers to electronically managed data that uniquely represents a particular location within which a remotely accessible device is positioned. Non-limiting examples of a site location include GPS data representing a location of a remotely accessible device or a plant within which the remotely accessible device is associated, a user-provided identifier of a location of the plant within which the remotely accessible device is located, and a higher-level location identifier (e.g., a state, city, region, zip code, or other defined but non-coordinate data) that represents a location within which the remotely accessible device is located.

Example Systems and Apparatuses of the Disclosure

FIG. 1 illustrates an example system in which embodiments of the present disclosure may operate. Specifically, FIG. 1 depicts an example system 100. As illustrated, the system 100 includes a secure intermediary system 102, client device 104, and remotely accessible device 106. Optionally, in some embodiments the system 100 includes administrator device 108. In some embodiments, the secure intermediary system 102, client device 104, remotely accessible device 106, and/or administrator device 108 communicate over one or more communications network(s), for example communications network 110 and/or communications network 112.

It should be appreciated that the communications network 110 and communications network 112 in some embodiments is embodied in any of a myriad of network configurations. In some embodiments, the communications network 110 and/or communications network 112 embodies a public network (e.g., the Internet). In some embodiments, the communications network 110 and/or communications network 112 embodies a private network (e.g., an internal localized, or closed-off network between particular devices). In some other embodiments, the communications network 110 and/or communications network 112 embodies a hybrid network (e.g., a network enabling internal communications between particular connected devices and external communications with other devices). The communications network 110 and/or communications network 112 in some embodiments includes one or more base station(s), relay(s), router(s), switch(es), cell tower(s), communications cable(s) and/or associated routing station(s), and/or the like. In some embodiments, the communications network 110 and/or communications network 112 includes one or more user controlled computing device(s) (e.g., a user owned router and/or modem) and/or one or more external utility devices (e.g., Internet service provider communication tower(s) and/or other device(s)).

Each of the components of the system 100 communicatively coupled to transmit data to and/or receive data from one another over the same or different wireless and/or wired networks embodying the communications network 110 and communications network 112. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 110 and/or communications network 112 the various embodiments are not limited to this architecture. In other embodiments, one or more computing entities share one or more components, hardware, and/or the like, or otherwise are embodied by a single computing device such that connection(s) between the computing entities are over the communications network 110 and/or communications network 112 are altered and/or rendered unnecessary. For example, in some embodiments, the secure intermediary system 102 includes some or all of a client system (e.g., one of the administrator device 108), such that an external communications network 110 and/or communications network 112 is not required.

In some embodiments, the communications network 110 and communications network 112 are embodied by the same communications network, for example the Internet. Additionally or alternatively, in some embodiments, the communications network 110 and the communications network 112 embody separate network(s) and/or subnetwork(s) having different authentication requirement(s) for communication. For example, in some embodiments the communications network 110 embodies a public or hybrid network accessible via any number of computing device(s), and the communications network 112 embodies a private, secured network that allows communication via a limited number of device(s) that are authorized for communication over the communications network 112 based at least in part on particular authentication credentials, identifiers, and/or the like.

The client device 104 includes any number of computing device(s), system(s), physical component(s), and/or the like, that facilitates remote-based access of at least one remotely accessible device. In some embodiments, the client device 104 includes or embodies one or more computer(s). In some embodiments, client device 104 includes hardware, software, firmware, and/or any combination thereof, that facilitates access to functionality for transferring data to and/or from at least one remotely accessible device, and/or otherwise remotely accessing a remotely accessible device, via one or more communications network(s). In some embodiments, the client device 104 includes or embodies a user device, worker end terminal, smartphone, tablet, personal computer, and/or the like. In some embodiments, the client device 104 is an enterprise device owned and/or otherwise controlled by an enterprise that similarly owns and/or controls the remotely accessible device 106 and/or secure intermediary system 102. In some embodiments, the client device 104 is a third-party device owned and/or otherwise controlled by another entity, for example a vendor device utilized to perform maintenance of the remotely accessible device 106 by a third-party vendor.

The remotely accessible device 106 includes any number of computing device(s), system(s), physical component(s), and/or the like, that performs one or more operation(s) and is remotely accessible via one or more communications network(s). In some embodiments, the remotely accessible device 106 includes or embodies one or more computer(s). In some embodiments, the remotely accessible device 106 embodies or includes at least one operational technology device specially configured to monitor and/or control an operational process. For example, in some embodiments the remotely accessible device 106 includes hardware, software, firmware, and/or any combination thereof that facilitates at least a portion of a process performed by a component of an industrial control system. The remotely accessible device 106 in some such embodiments may be connected to or otherwise operate in conjunction with one or more other OT devices in an OT network to perform one or more industrial control process(es). In some embodiments, the remotely accessible device 106 embodies an IT network device, for example one or more server(s), switch(es), firewall(s), and/or the like.

The remotely accessible device 106 in some embodiments includes hardware, software, firmware, and/or any combination thereof, that generates, measures, produces, and/or transmits data across one or more communication network(s). Additionally or alternatively, in some embodiments, the remotely accessible device 106 includes hardware, software, firmware, and/or any combination thereof, that receives data from an external device via one or more communications network(s). For example, in some embodiments, the remotely accessible device 106 is configurable at least in part via one or more data value(s) received from an external device, for example based at least in part on remote action data transmitted and/or otherwise stored to the remotely accessible device 106 from an external device. The remote action data may be utilized to reconfigure the remotely accessible device 106, copied to the remotely accessible device 106, and/or otherwise processed by the remotely accessible device 106 from an external source.

In some embodiments, client device 104 includes hardware, software, firmware, and/or any combination thereof, that facilitates access to functionality for transferring data to and/or from at least one remotely accessible device, and/or otherwise remotely accessing a remotely accessible device, via one or more communications network(s). In some embodiments, the client device 104 includes or embodies a user device, worker end terminal, smartphone, tablet, personal computer, and/or the like. In some embodiments, the client device 104 is an enterprise device owned and/or otherwise controlled by an enterprise that similarly owns and/or controls the remotely accessible device 106 and/or secure intermediary system 102. In some embodiments, the client device 104 is a third-party device owned and/or otherwise controlled by another entity, for example a vendor device utilized to perform maintenance of the remotely accessible device 106 by a third-party vendor.

The secure intermediary system 102 includes hardware, software, firmware, and/or any combination thereof, that facilitates management of remote action data to be transferred associated with a particular initiated remote access action. In some embodiments, the remotely accessible device 106 includes or embodies one or more computer(s). In some embodiments, remotely accessible device 106 includes hardware, software, firmware, and/or any combination thereof, that facilitates access to functionality for receiving remote action data from at least one client device, such as the client device 104, quarantining such remote action data, and determining whether to block transfer of the remote action data and/or facilitate transfer of the remote action data. For example, in some such embodiments, the secure intermediary system 102 includes one or more device(s) specially configured to perform a maliciousness determination associated with remote action data and/or an initiated remote access action. Additionally or alternatively, in some embodiments, the secure intermediary system 102 includes one or more device(s), system(s), and/or the like that generate notification(s) and/or store data based at least in part on received remote action data and/or data derived therefrom. The secure intermediary system 102 may access (e.g., for read and/or write purposes) one or more data repositories maintained by the secure intermediary system 102 or as a sub-system thereof, and/or in some embodiments as one or more external and/or cloud data repositories (not depicted) communicable over one or more communications network(s). In some embodiments, non-limiting examples of a secure intermediary system 102 includes a specially configured application server and/or database server, a cloud system, at least one enterprise terminal, and/or the like, communicable with at least one client device and at least one remotely accessible device.

The optional administrator device 108 includes hardware, software, firmware, and/or any combination thereof, that facilitates approving or blocking transmission of remote action data. In some embodiments, the administrator device 108 includes one or more computer(s). In some embodiments, the administrator device 108 is embodied as a sub-device or sub-system of the secure intermediary system 102, for example where the administrator device 108 embodies a user terminal of an enterprise system (e.g., a work computer utilized by an administrator user).

In some embodiments, the administrator device 108 includes hardware, software, firmware, and/or any combination thereof, that facilitates receiving a notification associated with an initiated remote access action, for example via a secure intermediary system 102, and providing response data indicative of a request to revoke a block of transmission of remote action data and/or maintain a block of transmission of remote action data. In some embodiments, non-limiting examples of an administrator device 108 include a user end terminal, a smartphone, a personal computer, a laptop, a tablet, and/or the like. In some embodiments, the administrator device corresponds to a particular user defined for the remotely accessible device 106, and/or is determinable based at least in part on an identifier associated with the remotely accessible device 106, an entity owning and/or otherwise controlling the remotely accessible device 106, and/or the like.

Figure 2:
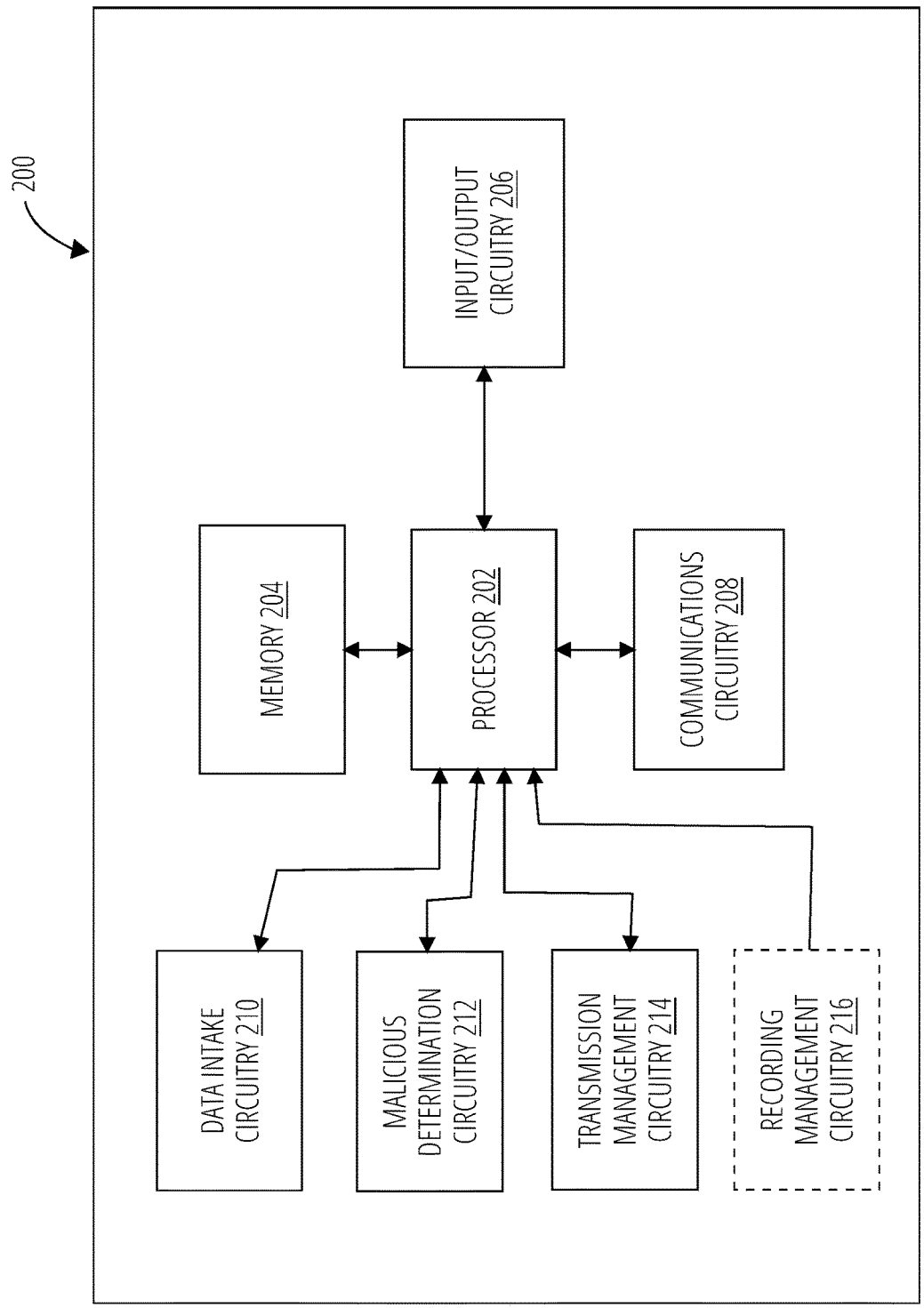
FIG. 2 illustrates a block diagram of an example apparatus in accordance with at least one example embodiment of the present disclosure.

FIG. 2 illustrates a block diagram of an example apparatus in accordance with at least one example embodiment of the present disclosure. Specifically, FIG. 2 depicts an example secure intermediary apparatus ("apparatus 200") specially configured in accordance with at least some example embodiments of the present disclosure. In some embodiments, the secure intermediary system 102 and/or a portion thereof is embodied by one or more system(s), such as the apparatus 200 as depicted and described in FIG. 2. The apparatus 200 includes processor 202, memory 204, input/output circuitry 206, communications circuitry 208, data intake circuitry 210, malicious determination circuitry 212, transmission management circuitry 214, and optionally recording management circuitry 216. In some embodiments, the apparatus 200 is configured, using one or more of the sets of circuitry embodied by processor 202, memory 204, input/output circuitry 206, communications circuitry 208, data intake circuitry 210, malicious determination circuitry 212, transmission management circuitry 214, and/or recording management circuitry 216, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with improved remote access operations. In some such embodiments, the processor 202 includes hardware, software, firmware, and/or a combination thereof that receives remote action data from a client device, the remote action data associated with a requested remote access action. Additionally or alternatively, in some embodiments, the processor 202 includes hardware, software, firmware, and/or any combination thereof, that processes received remote action data to perform a corresponding maliciousness determination. In some embodiments, the processor 202 processes the remote action data to generate malicious determination data corresponding to the received remote access action and/or remote access action associated therewith. Additionally or alternatively, in some embodiments, the processor 202 includes hardware, software, firmware, and/or any combination thereof, that proceeds with processing the requested remote access action based at least in part on the results of the determination, for example based at least in part on the malicious determination data. Additionally or alternatively, in some embodiments, the processor 202 includes hardware, software, firmware, and/or any combination thereof, that identifies, derives, and/or stores audit log(s) and/or other data based at least in part on the remote action data, remote access action, and/or determination(s) associated therewith. Additionally or alternatively, in some embodiments, the processor 202 includes hardware, software, firmware, and/or any combination thereof, that cause rendering of user interface(s) including notification(s), data, and/or the like, based at least in part on the remote action data, remote access action, and/or determination(s) associated therewith.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes data intake circuitry 210. The data intake circuitry 210 includes hardware, software, firmware, and/or any combination thereof, that supports receiving remote action data. For example, in some embodiments, the data intake circuitry 210 includes hardware, software, firmware, and/or any combination thereof, that receives a request from a client device. In some such embodiments, the request embodies a request that initiates a remote access action. Additionally or alternatively, in some embodiments, the data intake circuitry 210 includes hardware, software, firmware, and/or any combination thereof, that receives remote action data. In some such embodiments, the remote action data is received separately from the client device. In some such embodiments, the data intake circuitry 210 includes hardware, software, firmware, and/or any combination thereof, that identifies the remote action data from the received request. In some embodiments, data intake circuitry 210 includes a separate processor, specially configured field programmable gate array (FPGA), or a specially programmed application specific integrated circuit (ASIC).

In some embodiments, the apparatus 200 includes malicious determination circuitry 212. The malicious determination circuitry 212 includes hardware, software, firmware, and/or a combination thereof, that supports generation of data representing whether the remote action data associated with the initiated remote access action is determined malicious. In some embodiments, the data indicates the results of a maliciousness determination performed via the malicious determination circuitry 212, for example embodied by malicious determination data. For example, in some embodiments, the malicious determination circuitry 212 includes hardware, software, firmware, and/or any combination thereof, that generates malicious determination data. Additionally or alternatively, in some embodiments, the malicious determination circuitry 212 includes hardware, software, firmware, and/or any combination thereof, that processes the remote action data using a particular model to generate the malicious determination data. Additionally or alternatively, in some embodiments, the malicious determination circuitry 212 includes hardware, software, firmware, and/or any combination thereof, that processes at least the remote action data utilizing a rules set, maliciousness heuristics model, and/or logic policy, to generate the malicious determination data. Additionally or alternatively, in some embodiments, the malicious determination circuitry 212 includes hardware, software, firmware, and/or any combination thereof, that determines one or more identifier(s) associated with the initiated remote access action and/or remote action data associated therewith, where the malicious determination circuitry 212 processes the remote action data based at least in part on the identifier(s). For example, in some embodiments, the malicious determination circuitry 212 identifies at least one site location, enterprise identifier, and/or the like, and identifies a model (e.g., a logic policy, rules set, and/or maliciousness heuristics model) based at least in part on any one or more of such identifier(s). Additionally or alternatively, in some embodiments, the malicious determination circuitry 212 includes hardware, software, firmware, and/or any combination thereof, that compares the remote action data with data of a particular database, for example a file database or a text database. Additionally or alternatively, in some embodiments, the malicious determination circuitry 212 includes hardware, software, firmware, and/or any combination thereof, that determines whether particular clipboard text data represents malicious code or malicious text. In some embodiments, malicious determination circuitry 212 includes a separate processor, specially configured field programmable gate array (FPGA), or a specially programmed application specific integrated circuit (ASIC).

In some embodiments, the apparatus 200 includes transmission management circuitry 214. The transmission management circuitry 214 includes hardware, software, firmware, and/or a combination thereof, that facilitates handling of a requested remote access action. For example, in some embodiments, the transmission management circuitry 214 includes hardware, software, firmware, and/or any combination thereof, that determines whether to block a remote access action of the remote action data based at least in part on the results of a maliciousness determination, for example based at least in part on malicious determination data. Additionally or alternatively, in some embodiments, the transmission management circuitry 214 includes hardware, software, firmware, and/or any combination thereof, that blocks a remote access action transferring remote action data in response to determining that the malicious determination data indicates that the remote action data and/or remote access action is/are not malicious. Additionally or alternatively, in some embodiments, the transmission management circuitry 214 includes hardware, software, firmware, and/or any combination thereof, that blocks a remote access action transferring remote action data in response to determining that the malicious determination data indicates that the remote action data and/or remote access action is/are malicious. Additionally or alternatively, in some embodiments, the transmission management circuitry 214 includes hardware, software, firmware, and/or any combination thereof, that generates and/or stores an audit logs associated with the remote access action, remote action data, and/or determination(s) associated therewith. Additionally or alternatively, in some embodiments, the transmission management circuitry 214 includes hardware, software, firmware, and/or any combination thereof, that generates and/or causes rendering of a notification, for example in response to generating malicious determination data indicating a malicious determination. In some embodiments, transmission management circuitry 214 includes a separate processor, specially configured field programmable gate array (FPGA), or a specially programmed application specific integrated circuit (ASIC).

In some embodiments, the apparatus 200 optionally includes recording management circuitry 216. The recording management circuitry 216 includes hardware, software, firmware, and/or a combination thereof, that supports playback of display data of a client device, where the display data playback is configured based at least in part on the requested remote access action(s) and/or maliciousness determination(s) associated with the client device. For example, in some embodiments, the recording management circuitry 216 includes hardware, software, firmware, and/or any combination thereof, that causes recording of a display associated with a client device. Additionally or alternatively, in some embodiments, the recording management circuitry 216 includes hardware, software, firmware, and/or any combination thereof, that receives display data associated with a client device and records it, or receives recorded display data from the client device. Additionally or alternatively, in some embodiments, the recording management circuitry 216 includes hardware, software, firmware, and/or any combination thereof, that causes rendering of a user interface depicting a video of recorded display data across a defined timeseries, where the user interface is specially configured based at least in part on at least one initiated remote access action. For example, in some embodiments the user interface is configured to indicate each point in the defined timeseries at which a remote access action was initiated or blocked. In some embodiments, the user interface is configured to automatically seek to a particular point at which a remote access action was initiated or blocked. Additionally or alternatively, in some embodiments, the recording management circuitry 216 includes hardware, software, firmware, and/or any combination thereof, that provides recorded display data to a particular computing device for rendering. In some embodiments, recording management circuitry 216 includes a separate processor, specially configured field programmable gate array (FPGA), or a specially programmed application specific integrated circuit (ASIC).

Additionally or alternatively, in some embodiments, two or more of the sets of circuitries embodying processor 202, memory 204, input/output circuitry 206, communications circuitry 208, data intake circuitry 210, malicious determination circuitry 212, transmission management circuitry 214, and/or recording management circuitry 216. Alternatively or additionally, in some embodiments, one or more of the sets of circuitry perform some or all of the functionality described associated with another component. For example, in some embodiments, two or more of the sets of circuitry embodied by processor 202, memory 204, input/output circuitry 206, communications circuitry 208, data intake circuitry 210, malicious determination circuitry 212, transmission management circuitry 214, and/or recording management circuitry 216, are combined into a single module embodied in hardware, software, firmware, and/or a combination thereof. Similarly, in some embodiments, one or more of the sets of circuitry, for example data intake circuitry 210, malicious determination circuitry 212, transmission management circuitry 214, and/or recording management circuitry 216, is/are combined with the processor 202, such that the processor 202 performs one or more of the operations described above with respect to each of these sets of circuitry embodied by the data intake circuitry 210, malicious determination circuitry 212, transmission management circuitry 214, and/or recording management circuitry 216.

Example Data Flows of the Disclosure

Having described example apparatuses and systems in accordance with the disclosure, example data flows in accordance with the disclosure will now be described. The data flow(s) describe generation, transmission, and/or processing of particular data to facilitate improved remote access action(s). In some embodiments, the data flow includes operations performed by computing system(s) embodying individual system(s), device(s), apparatus(es), and/or the like, and data transmissions between such computing system(s). In some embodiments, the data transmission(s) are facilitated via one or more communications network(s) connecting such computing device(s).

Figure 3:
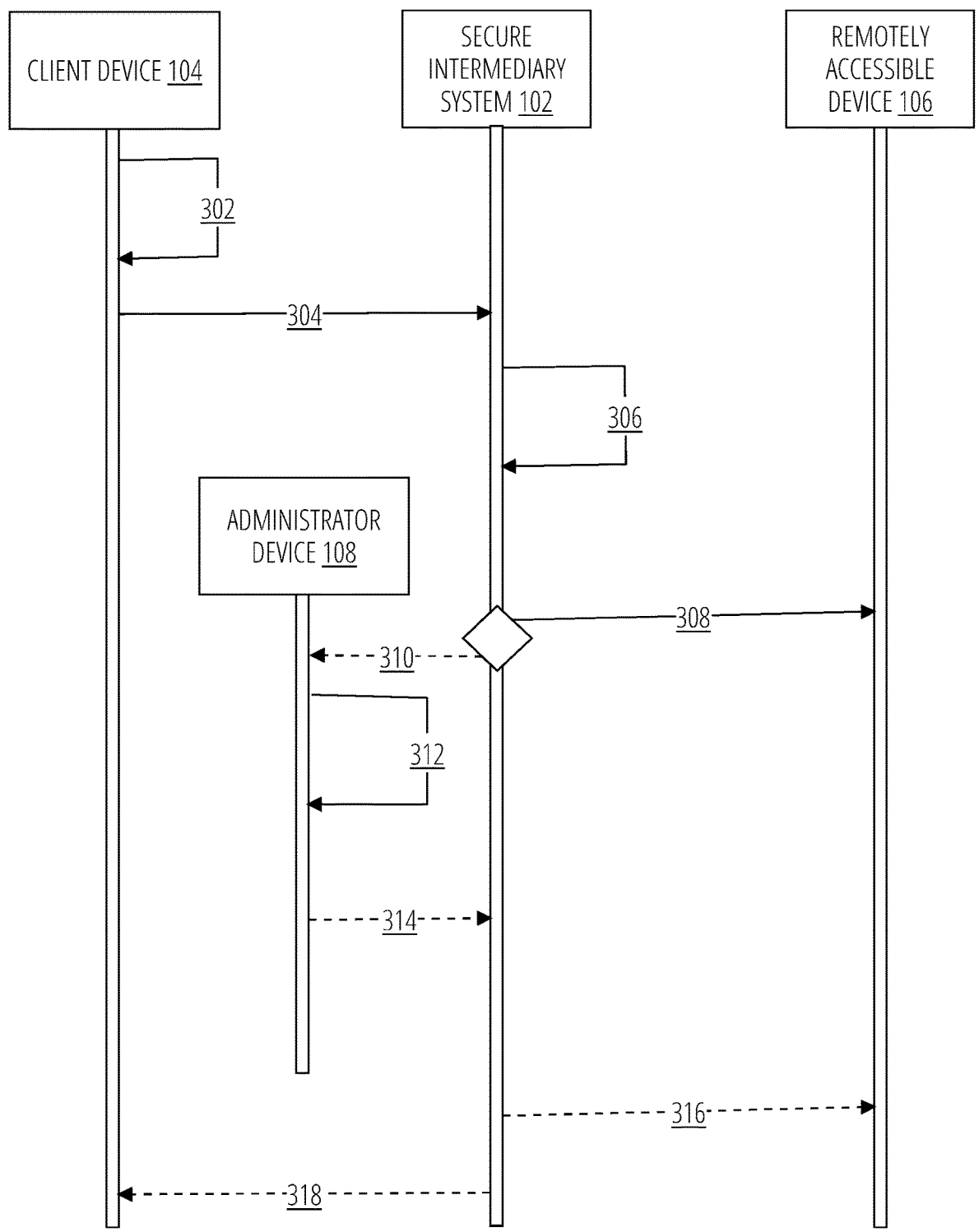
FIG. 3 illustrates a data flow diagram of for performing a remote access action of data in accordance with at least one example embodiment of the present disclosure.

FIG. 3 illustrates a data flow diagram of for performing a remote access action of data in accordance with at least one example embodiment of the present disclosure. Specifically, FIG. 3 depicts an example data flow between secure intermediary system 102, client device 104, remotely accessible device 106, and optionally an administrator device 108. The secure intermediary system 102, client device 104, administrator device 108, and optional administrator device 108 perform such data operations and transmissions to perform the improved remote access action of data.

The data flow begins at step 302. At step 302, the client device 104 receives a request to initiate a remote access action. Specifically, in some embodiments, the request is received in response to user input performing a copy or other transfer of particular remote action data from the client device to a particular remotely accessible device, specifically remotely accessible device 106. In some embodiments, the remote access action embodies a copy action of particular copied data selected by the user of the client device 104 and selection of the remotely accessible device 106 to receive the copied data, where transfer of such copied data is initiated from the client device 104 to the remotely accessible device 106.

At step 304, the client device 104 transmits, to the secure intermediary system 102, particular data embodying a request to initiates a remote access action. In some embodiments, the the request indicates an initiated request to transfer (e.g., copy or otherwise move) remote action data from the client device to a particular remotely accessible device, specifically remotely accessible device 106. In some embodiments, the request includes data identifying the client device 104 that initiated the request, data identifying the remotely accessible device 106, and/or the remote action data or data identifying the remote action data. In some embodiments, the request is transmitted in response to user engagement with the client device 104 initiating the request.

At step 306, the secure intermediary system 102 processes data associated with the request to determine how to handle the request. For example, in some embodiments, the secure intermediary system 102 processes the data of the request to determine whether the remote access action should be allowed to proceed or blocked. In some embodiments, the secure intermediary system 102 performs a maliciousness determination based at least in part on remote action data received together with the request. In some such embodiments, the secure intermediary system 102 compares the remote action data (e.g., embodying copied clipboard text data, file data, and/or the like) from the client device 104 to data of a particular corresponding database that includes known or otherwise previously determined data indicated as malicious (e.g., malicious text, malicious code, malicious file data, and/or the like). Additionally or alternatively, in some embodiments the secure intermediary system 102 processes, utilizing one or more other algorithm(s) that indicate maliciousness, the received request, data indicative of the remote access action, an identifier associated with the remotely accessible device 106, and/or the remote action data otherwise to determine whether the request is malicious or not malicious. In some embodiments, the secure intermediary system 102 processes any of such data with a maliciousness heuristics model configured to indicate whether such data is indicative of a malicious remote access action and/or remote action data. Additionally or alternatively, in some embodiments, the secure intermediary system 102 generates and/or stores data indicative of the results of the maliciousness determination. In some embodiments, the secure intermediary system 102 stores audit log data indicative of whether the remote access action and/or transmission of the remote action data was determined malicious or not malicious, and/or whether transmission was blocked or automatically completed. In some embodiments, the audit log is generated together with a timestamp at which such data was received and/or the system completed such a determination.

The secure intermediary system 102 may proceed to one or more particular step(s) based at least in part on data resulting from the performed maliciousness determination. For example, in some embodiments, in a circumstance where the secure intermediary system 102 determines that the request, and/or data thereof, is not malicious, the secure intermediary system 102 executes step 308. At step 308, the secure intermediary system 102 proceeds automatically with the transmission of remote action data in response to the request. In this regard, the secure intermediary system 102 may continue to copy remote action data received via the request to the remotely accessible device 106, for example via transmission of the remote action data and/or a corresponding second request via one or more communications network(s). In response to receiving the remote action data, the remotely accessible device 106 may store such remote action data accordingly, update one or more configuration(s), and/or otherwise process or utilize the received remote action data. In some embodiments, the remotely accessible device 106 processes and/or stores the received remote action data in a particular manner based at least in part on the specific remote access action that initiated the request to the secure intermediary system 102.

Alternatively, in some embodiments, in a circumstance where the secure intermediary system 102 determines that the request, and/or data thereof, is malicious, the secure intermediary system 102 may automatically initiate a block of transmission of the data associated with the request to the remotely accessible device 106. For example, in some embodiments, the secure intermediary system 102 terminates or otherwise does not complete transmission of the remote action data to the remotely accessible device 106. Additionally or alternatively still, in some embodiments, the secure intermediary system 102 optionally executes step 310 in a circumstance where the secure intermediary system 102 determines that the request, and/or data thereof, is malicious.

At step 310, the secure intermediary system 102 transmits a notification to at least one administrator device, for example the administrator device 108. In some embodiments, the administrator device 108 is statically known or otherwise predetermined such that the secure intermediary system 102 can identify the administrator device 108 for transmitting to without processing other data. In some embodiments, the secure intermediary system 102 determines the administrator device 108 to receive the notification based at least in part on an identifier corresponding to the remotely accessible device 106, and/or other data from the request received from the client device 104, for example the remote action data, remote access action, and/or the like. Additionally or alternatively, in some embodiments, the administrator device 108 is determined based at least in part on data generated and/or otherwise determined via the secure intermediary system 102, for example based at least in part on current timestamp data at the time the notification is generated and/or transmitted.

In some embodiments, the notification indicates that the transmission of the remote action data was blocked by the secure intermediary system 102. In some embodiments, the notification includes data indicating the requested remote access action, remote action data, identity of the remotely accessible device 106 associated with the remote access action, and/or the like. Additionally or alternatively, in some embodiments, the notification includes data indicating a reason determined for why the remote access action was blocked. Additionally or alternatively, in some embodiments, the notification includes metadata, timestamp data, and/or other particular data parameter(s) that are helpful to a system and/or user to determine whether to maintain or reverse the block of the transmission of the remote action data.

It should be appreciated that the notification may be transmitted in any of a myriad of manners utilizing any of a number of communications mechanism(s) and/or protocol(s). In some embodiments, the secure intermediary system 102 transmits the notification as a push notification to the administrator device 108. Additionally or alternatively, in some embodiments, the secure intermediary system 102 transmits the notification as a text message to the administrator device 108. Additionally or alternatively, in some embodiments, the secure intermediary system 102 transmits the notification as an email or other third-party communication application accessible to the administrator device 108. Additionally or alternatively, in some embodiments, the secure intermediary system 102 stores data to a database indicative of the notification, which is retrieved by the administrator device 108 and transmitted accordingly upon accessing of a particular application (e.g., a user-facing application corresponding to accessing the secure intermediary system 102) at the administrator device 108.

At step 312, the administrator device 108 renders the notification. In some embodiments, the notification is rendered to a screen or other display of the administrator device 108. In this regard, a user of the administrator device 108 (e.g., an administrator user responsible for maintaining cybersecurity at least with respect to access of the remotely accessible device 106) may view and/or analyze the information associated with the notification to make a determination as to whether the block of the transmission of the remote action data should be maintained. Additionally or alternatively, in some embodiments the administrator device 108 automatically processes the data included in the transmitted notification to make an automatic determination indicating whether the block should be maintained.

Additionally or alternatively, in some embodiments a user associated with the administrator device 108 accesses and/or otherwise interacts with the notification to select whether to maintain the block of the transmission of the remote action data. In some embodiments, for example, the notification is rendered together with a first interface element that, upon user engagement, indicates an intent by an administrator user associated with the administrator device 108 to maintain the block of the transmission of the remote action data. Additionally or alternatively, in some embodiments, the notification is rendered together with a second interface element that, upon user engagement, indicates an intent by an administrator user associated with the administrator device 108 to reverse the block of the transmission of the remote action data. In this regard, the notification may be engageable to maintain blocking of the transmission of the remote action data to the remotely accessible device 106, and/or may be engageable to revoke the blocking of the transmission of the remote action data to the remotely accessible device.

In some embodiments, at optional step 314, the administrator device 108 transmits a notification response indicative of the intention provided by the administrator user in response to received user engagement with the notification. For example, in some embodiments, the administrator device 108 transmits a notification response to the secure intermediary system 102 embodying a request to maintain the block in a circumstance where the administrator user provides a first user engagement, and the administrator device 108 transmits a notification response to the secure intermediary system 102 embodying a request to revoke the block in a circumstance where the administrator user provides a second user engagement. In some embodiments, the secure intermediary system 102 stores audit log data indicative of the received notification response (e.g., whether revoking the block of the transmission of the remote action data was requested). In some embodiments, the audit log is generated together with a timestamp at which such data was received and/or the system completed such a determination.

In some embodiments, the secure intermediary system 102 further processes and/or interacts with the received notification response. For example, in some embodiments, the secure intermediary system 102 executes step 316 in a circumstance where the notification request embodies a request to revoke the block of the transmission of the remote action data to the remotely accessible device 106, the secure intermediary system 102 proceeds with transmission of the remote action data. In some such embodiments, at step 316 the secure intermediary system 102 transmits the remote action data to the remotely accessible device 106 as described with respect to step 308, even though the block was originally initiated at or after step 306.

Example User Interfaces of the Disclosure

Having described example apparatuses, systems, and data flows in accordance with the disclosure, example user interfaces in accordance with the disclosure will now be described. The user interfaces are each generable, displayable, and/or otherwise renderable by one or more of the specially configured computing device(s) as described herein with respect to performance of improved remote access of a remotely accessible device.

Figure 4:
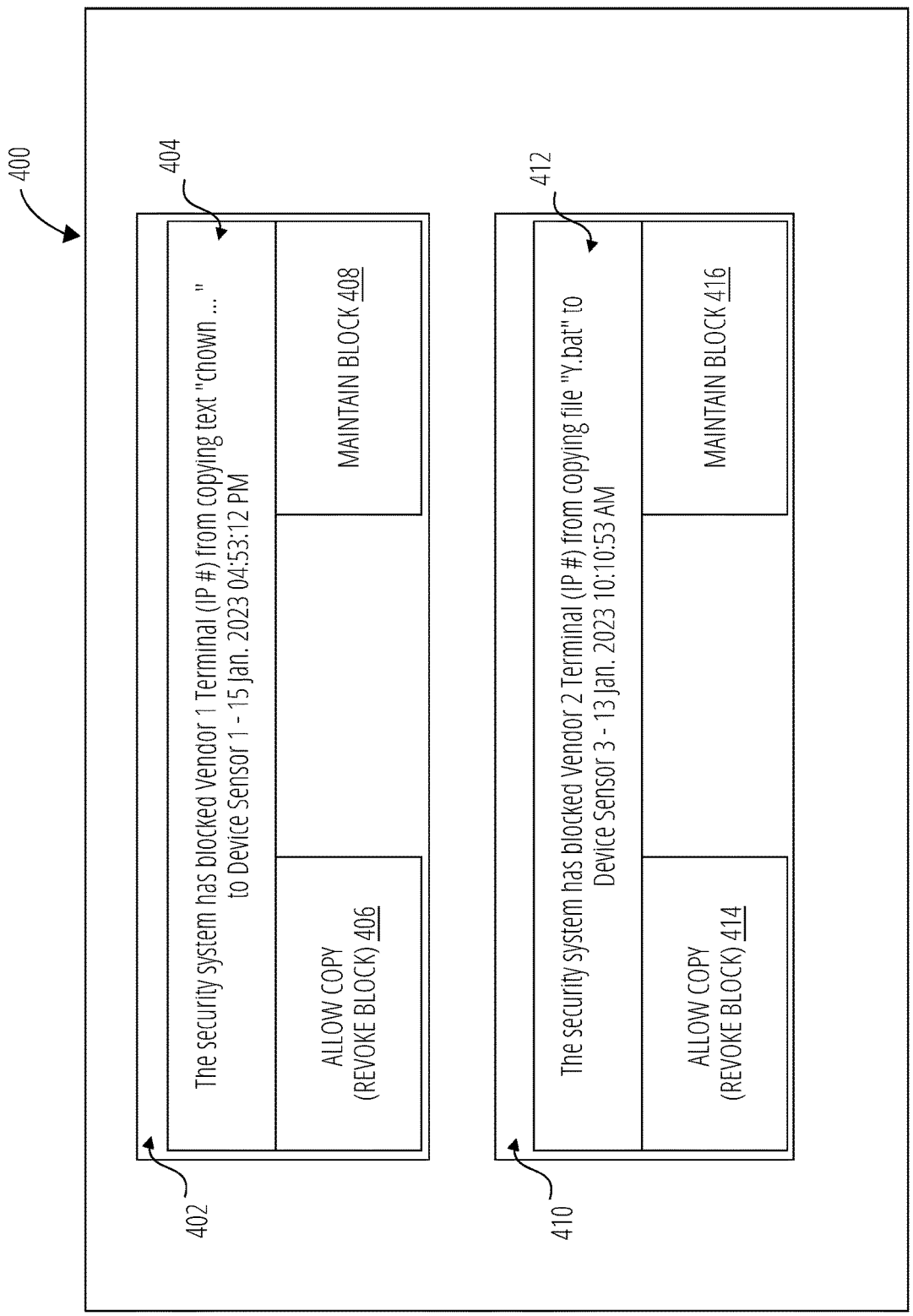
FIG. 4 illustrates a visualization of example notifications renderable in accordance with at least one example embodiment of the present disclosure.

FIG. 4 illustrates a visualization of example notifications renderable in accordance with at least one example embodiment of the present disclosure. Specifically, FIG. 4 depicts an example interface 400. In some embodiments, the interface 400 is renderable to an administrator device. For example, in some embodiments, the interface 400 is rendered in response to the administrator device receiving one or more notification(s), for example from a secure intermediary system 102 embodied by the apparatus 200, in response to one or more performed maliciousness determination(s) corresponding to one or more initiated remote access action(s).

As illustrated, the interface 400 includes one or more interface elements embodying any number of notifications, specifically notification 402 and notification 410. The notification 402 is associated with a first blocked transmission associated with a first initiated remote access action. The notification 410 is associated with a second blocked transmission associated with a second initiated remote access action. Specifically, notification 402 corresponds to a blocked transmission of remote action data embodying clipboard text data, and notification 410 corresponds to a blocked transmission of remote action data embodying file data.

As illustrated, the notification 402 includes a notification description 404. The notification description 404 includes detail data associated with the blocked transmission of clipboard text data in response to a requested remote access action. Specifically, notification description 404 embodies a label including a text description indicating several determined data parameter values associated with the block of the transmission of the clipboard text data. The text description includes, for example, (1) data identifying an associated entity (e.g., a vendor such as "Vendor 1") that initiated the remote access action, (2) data identifying a client device that initiated the remote access action (e.g., an IP address), (3) the copied clipboard text data embodying the remote action data, (4) data identifying a remotely accessible device requested to receive the remote action data, and (5) timestamp data representing the datetime at which the transfer was initiated and/or at which the block occurred. In this regard, a user of the device rendering the interface 400 (e.g., an administrator user associated with an administrator device to which the interface 400 is rendered) may analyze the detailed data in the notification description 404 to determine whether the initiated remote access action was malicious.

Similarly, the notification 410 includes notification description 412 including detailed data associated with the blocked transmission of file data in response to a requested remote access action. The notification description 412 embodies a label including a text description indicating several determined data parameter values associated with the block of the transmission of the file data. The text description includes, for example, (1) data identifying an associated entity (e.g., a vendor such as "Vendor 2") that initiated the remote access action, (2) data identifying a client device that initiated the remote access action (e.g., an IP address), (3) the copied file data embodying the remote action data, (4) data identifying a remotely accessible device requested to receive the remote action data, and (5) timestamp data representing the datetime at which the transfer was initiated and/or at which the block occurred. In this regard, a user of the device rendering the interface 400 (e.g., an administrator user associated with an administrator device to which the interface 400 is rendered) may analyze the detailed data in the notification description 412 to determine whether the initiated remote access action was malicious.

Each of the notifications 402 and 410 further includes one or more interface element(s) embodying a control to maintain a block of a transmission or revoke a block of a transmission. For example, the notification 402 includes revoke block control 406 and maintain block control 408, each configured to receive particular user engagement (e.g., a click, tap, or other engagement within the boundaries of the interface element). In some embodiments, a user engagement with the revoke block control 406 indicates a user desire to revoke a block of the transmission of the clipboard text data, whereas a user engagement with the maintain block control 408 indicates a user desire to maintain a block of the transmission of the clipboard text data. In some embodiments, a notification response is transmitted to the secure intermediary system 102 that generated and/or transmitted the notification in response to user engagement of either of the revoke block control 406 and/or maintain block control 408. The notification response in some embodiments indicates whether the user intends to revoke or maintain the block, for example by identifying the particular interface element for which user engagement was received.

It should be appreciated that a user may interact with each of the notification 402 and notification 410 independently. For example, an administrator may analyze the details of notification 402 and engage one of the revoke block control 406 or revoke block control 406 based on a determination of whether the administrator agrees that the initiated remote access action corresponding to the notification description 404 was malicious. The administrator may independently analyze the details of notification 410 and engage one of the revoke copy block 414 or maintain block block 416 based on a separate determination of whether the administrator agrees that the initiated remote access action corresponding to the notification description 412 was malicious. In this regard, an administrator user may separately block certain actions and revoke the block of other actions to maintain desired security of the corresponding remotely accessible device(s) and/or system as a whole.

Example Data Architectures of the Disclosure

Having described example apparatuses, systems, data flows, and user interfaces in accordance with the disclosure, visualizations of example environment(s) for performing maliciousness determination(s) in accordance with the disclosure will now be described. In some embodiments, the environment(s) depict data architecture(s) and/or interaction(s) between data within such environment(s) to perform one or more maliciousness determination(s). In some embodiments, the environment(s) are embodied at least in part by software environment(s) maintained by one or more software application(s) executed via particular hardware and/or firmware of one or more computing device(s), for example the secure intermediary system 102 embodied by the apparatus 200.

Figure 5:
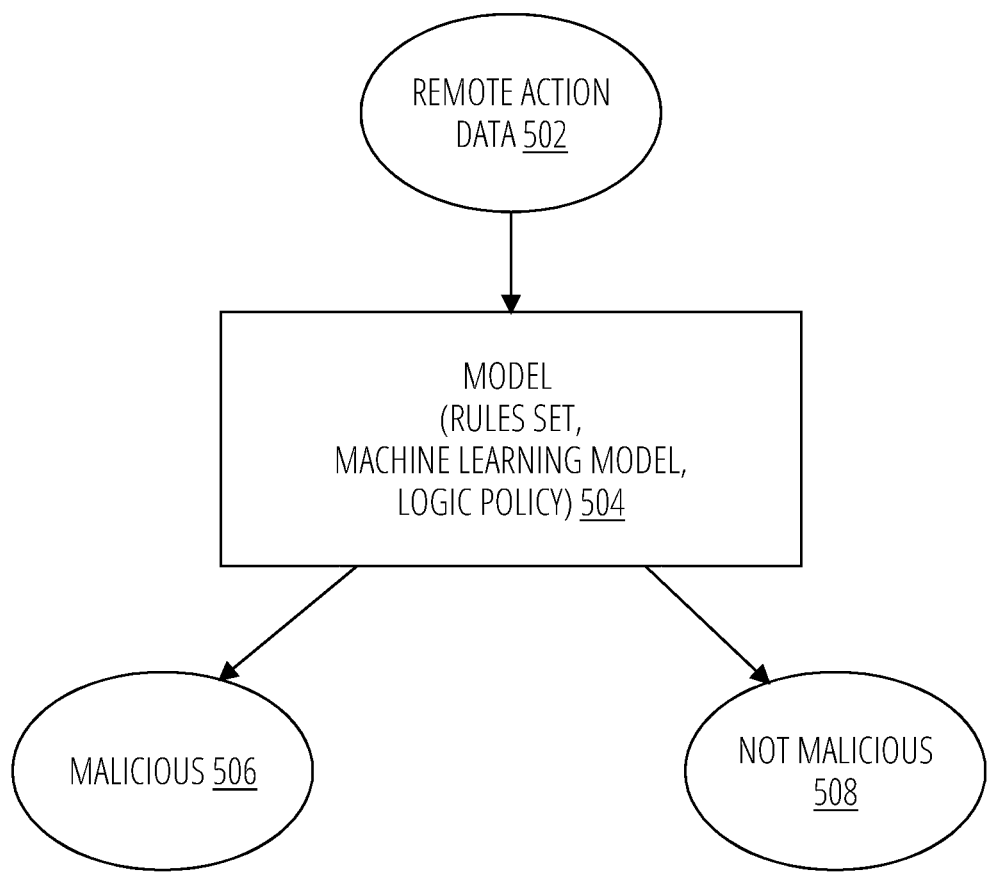
FIG. 5 illustrates a visualization of determining malicious determination data using a model in accordance with at least one example embodiment of the present disclosure.

FIG. 5 illustrates a visualization of determining malicious determination data using a model in accordance with at least one example embodiment of the present disclosure. Specifically, FIG. 5 depicts a particular maliciousness determination corresponding to remote action data 502. In some embodiments, the remote action data 502 is received by the apparatus 200 in response to a request associated with an initiated remote access action. In some embodiments, the remote action data 502 is received from a client device that initiated the remote access action associated with a particular remotely accessible device, for example to copy and/or otherwise transmit the remote action data 502 from the client device to the remotely accessible device. In some embodiments, for example, the remote action data 502 includes clipboard text data, file data, and/or the like copied from the client device.

In some embodiments, the apparatus 200 applies the remote action data 502 to a particular model 504. In some embodiments, the model 504 is specially configured to perform one or more process(es) that determine whether the inputted data, for example the remote action data 502, is malicious or otherwise indicates initiation of a remote access action that is malicious. In some embodiments, the model 504 embodies or includes a rules set that define(s) one or more data check(s), validation(s), and/or other sub-process(es) to process the remote action data 502. Additionally or alternatively, in some embodiments, the model 504 embodies or includes at least one machine learning model specially configured to process the inputted remote action data 502 and generate results data corresponding to a maliciousness determination. Additionally or alternatively, in some embodiments, the model 504 embodies or includes at least one logic policy. In some embodiments, the logic policy is determined based at least in part on the remote action data 502 and/or other data corresponding to the remote action data 502. In some embodiments, the logic policy includes one or more executable logical instruction(s) that determine whether the remote action data 502 is malicious or not malicious. For example, in some embodiments, the apparatus 200 determines and/or otherwise identifies the logic policy based at least in part on the remote action data 502, a site location corresponding to the remotely accessible device corresponding to the initiated remote access action associated with the remote action data 502, an enterprise identifier corresponding to an entity associated with the remotely accessible device corresponding to the initiated remote access action associated with the remote action data 502, and/or the like.

As illustrated, the model 504 generates and/or outputs data indicating the results of a maliciousness determination. For example, in some embodiments, the model 504 outputs results data. The results data in some embodiments includes a data value for a particular data parameter that indicates whether the remote action data 502 was determined malicious via the maliciousness determination performed at least in part by the model 504. In some embodiments, the model 504 outputs malicious determination data 506 representing a first data value indicating that the remote action data 502 was determined malicious, or malicious determination data 508 representing a second data value indicating that the remote action data 502 was determined not malicious. In some embodiments, the malicious determination data 506 embodies a first Boolean flag, and the malicious determination data 508 embodies the opposite Boolean flag. In other embodiments, the malicious determination data 506 and malicious determination data 508 each embody different integer or other numerical value(s), string(s), and/or other data types, where different values indicate whether the remote action data 502 was determined malicious or not malicious.

Figure 6:
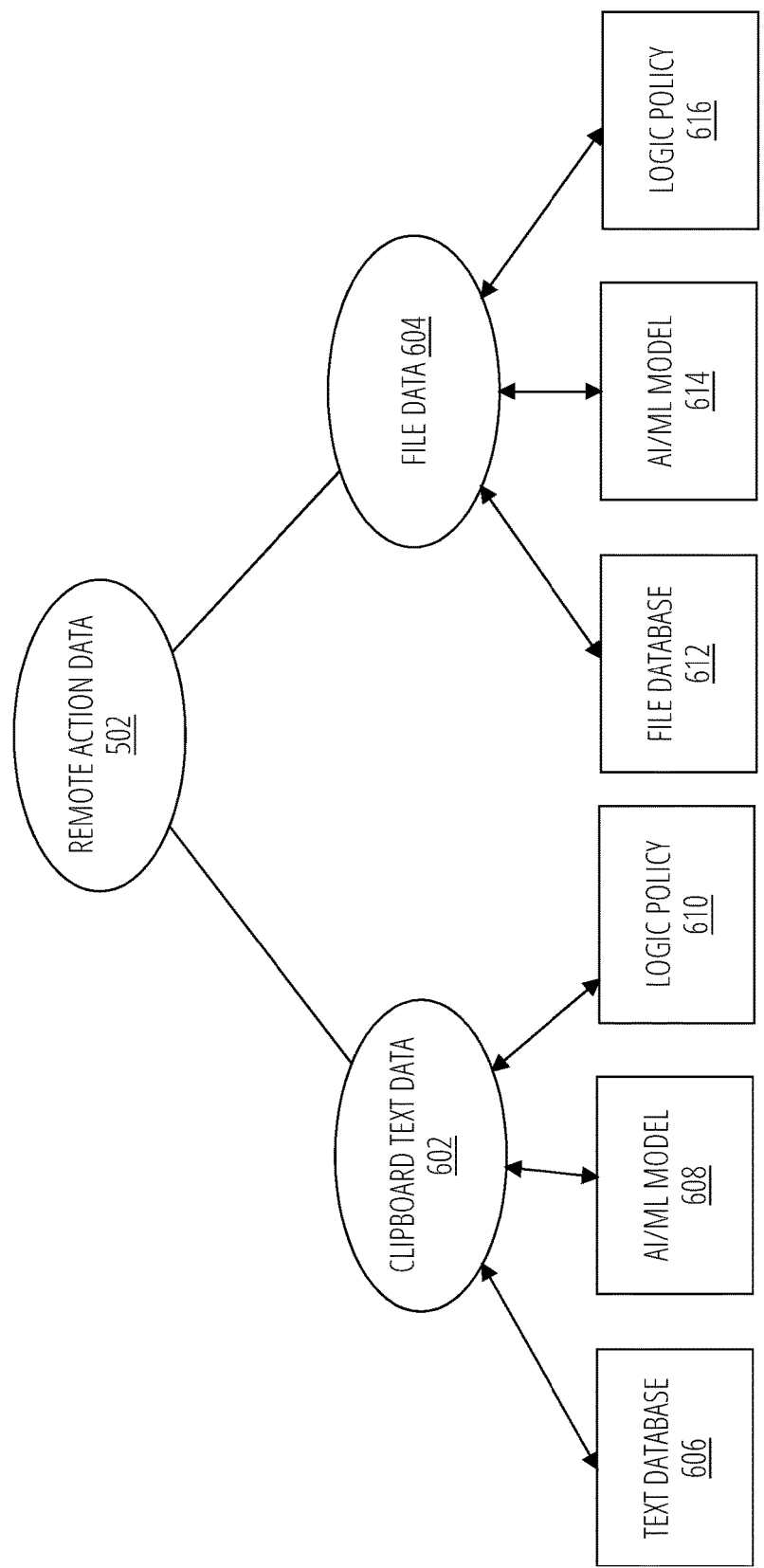
FIG. 6 illustrates a visualization of different types of remote action data and processing thereof in accordance with at least one example embodiment of the present disclosure.

FIG. 6 illustrates a visualization of different types of remote action data and processing thereof in accordance with at least one example embodiment of the present disclosure. Specifically, FIG. 6 illustrates a visualization of different data types embodying remote action data 502, and particular mechanisms for processing the different data types. It should be appreciated that some embodiments are configured only to process a single data type of remote action data. In some contexts, a single embodiment is configured to process any one of plurality of data types of remote action data.

In some embodiments, the remote action data 502 includes clipboard text data 602. The clipboard text data 602 includes text data copied from a particular client device for transfer to a particular remotely accessible device. The clipboard text data 602 in some embodiments may include any one of different types of text data. In some embodiments, the apparatus 200 is configured to process the clipboard text data 602 to determine the text data type of the clipboard text data 602. For example, in some embodiments, the clipboard text data 602 is processable to determine that the clipboard text data 602 includes or embodies code copied from the client device (e.g., formatted in a particular manner or otherwise including executable command(s)).

In some embodiments, the remote action data 502 includes file data 604. The file data 604 includes at least one defined data object that records particular data, application(s), and/or the like, processable and/or otherwise executable by at least one client device. In some embodiments, the file data 604 includes an application that is executable by a particular computing device. In some embodiments, the file data 604 includes stored data processable by one or more application(s) executable by a particular computing device, for example supporting data associated with the one or more application(s).

In some embodiments, different types of remote action data are processable utilizing a different maliciousness heuristics model that performs a maliciousness determination associated with the particular type of the remote action data 502. For example, in some embodiments, the clipboard text data 602 is processable via at least one first maliciousness heuristics model and the file data 604 is processable via at least one second maliciousness heuristics model. As illustrated, in some embodiments, the first maliciousness heuristics model that processes clipboard text data 602 may process the clipboard text data 602 via comparison with a text database 606. In some such embodiments, the text database 606 includes text data known to be malicious, such that comparison of the clipboard text data 602 with the text in the text database 606 indicates maliciousness in a circumstance where the clipboard text data 602 matches one or more entries of the text database 606. In some embodiments, the text database 606 stores malicious text previously determined as malicious by the system, marked as malicious by a subject matter expert, determined as malicious by one or more specially trained machine learning models, and/or the like. In some embodiments, the text database 606 stores malicious code determined as malicious by the system, marked as malicious by a subject matter expert, determined as malicious by one or more specially trained machine learning models, and/or the like. Additionally or alternatively, in some embodiments, the text database 606 includes clipboard text data previously indicated as not malicious.

Additionally or alternatively, in some embodiments, the maliciousness heuristics model processes the clipboard text data 602 via a specially configured AI/ML model 608. In some embodiments, the AI/ML model 608 is specially trained based at least in part on a training data set of malicious text. In some embodiments, the AI/ML model 608 is specially trained based at least in part on malicious code. In this regard, the AI/ML model 608 in some embodiments is configured to detect particular malicious text based at least in part on data trend(s), pattern(s), and/or other learning(s) indicative of malicious text derived from the training data set of malicious text.

Additionally or alternatively, in some embodiments, the maliciousness heuristics model processes the clipboard text data 602 via one or more particular logic policy 610. In some embodiments, the logic policy 610 is specific to processing clipboard text data. For example, in some embodiments, one or more logic policy is utilized to process clipboard text data, and one or more other logic policy is utilized to process file data.

As further illustrated, in some embodiments, the second maliciousness heuristics model utilized to process the file data 604 may process the file data 604 via comparison with a particular file database 612. In some embodiments, the file database 612 includes file data known to be malicious, such that comparison of the file data 604 with the file data in the file database 612 indicates maliciousness in a circumstance where the file data 604 matches one or more entries of the file database 612. In some embodiments, the file database 612 includes a hash or other processed representation of file data corresponding to a particular file, and the file data 604 may be similarly processed for comparison to the data of the file database 612. Additionally or alternatively, in some embodiments, the file database 612 includes file data for files previously indicated as not malicious.

Additionally or alternatively, in some embodiments, the maliciousness heuristics model processes the file data 604 via a specially configured AI/ML model 614. In some embodiments, the file data 604 is specially trained based at least in part on a training data set of malicious file data. In some embodiments, the AI/ML model 614 is specially trained based at least in part on a particular type of malicious file data, for example malicious application(s), supporting file(s), and/or the like. In this regard, the AI/ML model 614 in some embodiments is configured to detect particular malicious file data based at least in part on data trend(s), pattern(s), and/or other learning(s) indicative of malicious file data derived from the training data set of previously known or determined malicious file data.

Additionally or alternatively, in some embodiments, the maliciousness heuristics model processes the file data 604 via one or more particular logic policy 616. In some embodiments, the logic policy 616 is specific to processing file data. For example, in some embodiments, one or more logic policy is utilized to process file data, such as the file data 604, differs from the logic policy 610 utilized to process clipboard text data, such as the clipboard text data 602.

Example Processes of the Disclosure

Having described example apparatuses, systems, data flows, user interfaces, and data environments in accordance with the disclosure, example processes for performing maliciousness determination(s) in accordance with the disclosure will now be described. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 7:
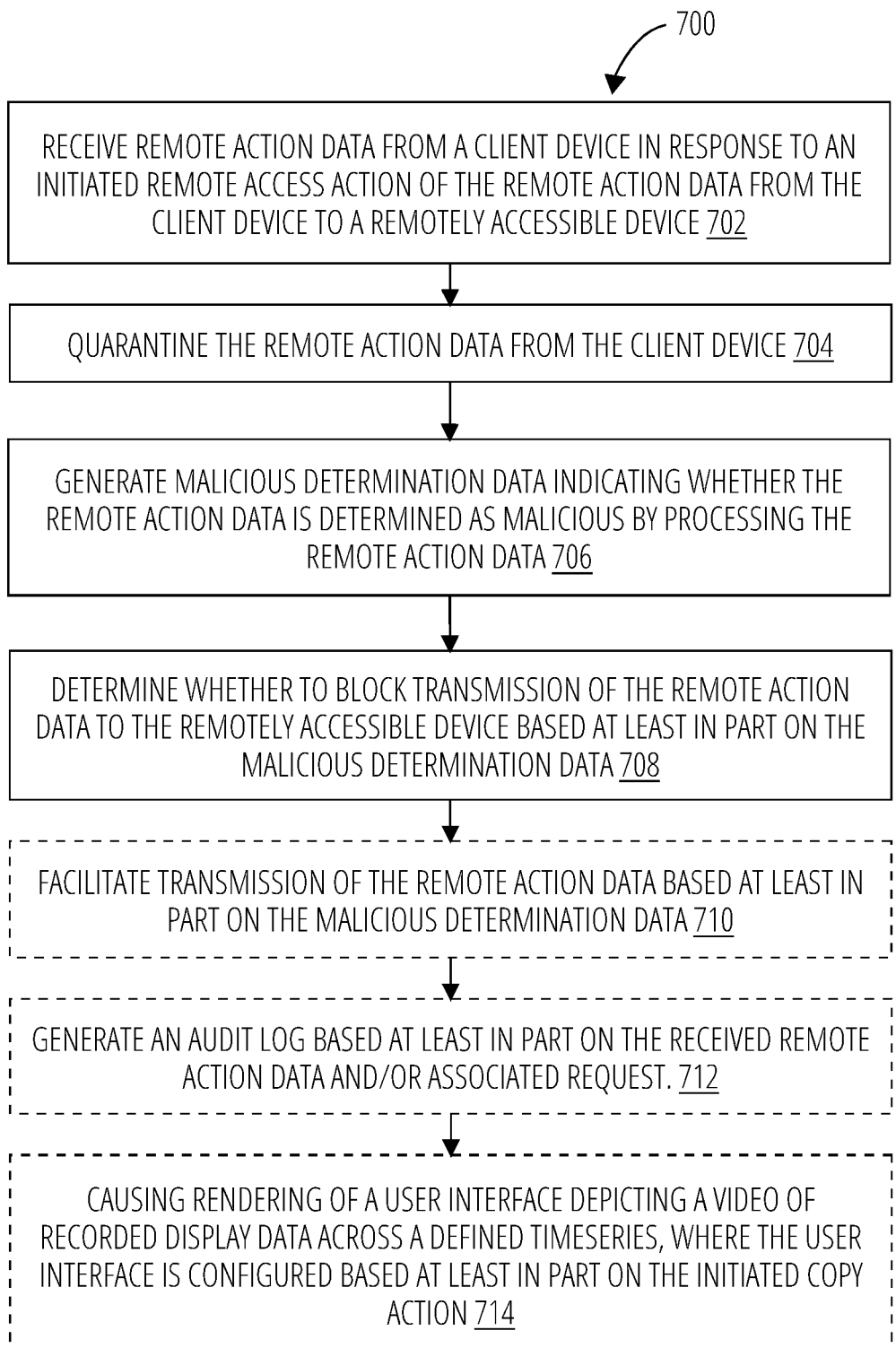
FIG. 7 illustrates a flowchart depicting operations of an example process for improved remote access operations in accordance with at least one example embodiment of the present disclosure.

FIG. 7 illustrates a flowchart depicting operations of an example process for improved remote access operations in accordance with at least one example embodiment of the present disclosure. Specifically, FIG. 7 depicts an example process 700. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one external data repository, client system, and/or the like, to perform one or more of the operation(s) as depicted and described. For purposes of simplifying the description, the process 700 is described as performed by and from the perspective of the apparatus 200.

According to some examples, the method includes receiving remote action data from a client device at operation 702. In some embodiments, the apparatus 200 receives the remote action data in response to an initiated remote access action associated with the remote action data from the client device. In some embodiments, the client device initiates a remote access action that requests transfer of the remote action data from the client device to a particular remotely accessible device. For example, in some embodiments, a user of the client device selects the particular remote action data to transmit via user engagement with the client device. In some embodiments, the user performs a particular user engagement with the client device, for example a copy operation performed on the client device to a clipboard, to select the remote action data. Additionally or alternatively, in some embodiments, a user of the client device selects the particular remotely accessible device to which the remote action data is to be transferred. For example, in some embodiments, the client device receives user engagement indicating an identifier of the remotely accessible device. Additionally or alternatively, in some embodiments, the client device depicts a user interface indicating one or more remotely accessible device(s) that are communicable with the client device, where the client device receives user engagement selecting the particular remotely accessible device intended to receive the transmission of the remote action data.

According to some examples, the method includes quarantining the remote action data from the client device at operation 704. In some embodiments, the apparatus 200 stores the remote action data in a manner that is inaccessible to the remotely accessible device at least until completion of a maliciousness determination. In some embodiments, the apparatus 200 maintains a separate virtualized environment within which the remote action data is stored and/or otherwise maintained.

According to some examples, the method includes generating malicious determination data at least by processing the remote action data at operation 706. In some embodiments, the malicious determination data indicates whether the remote action data is determined as malicious. For example, in some embodiments the malicious determination data includes a first data value in a circumstance where the remote action data is determined malicious, or a second data value in a circumstance where the remote action data is determined not malicious. In some embodiments, the apparatus 200 generates the malicious determination data utilizing at least one maliciousness heuristics model, for example embodied by at least one rules set, AI/ML model, logic policy, and/or the like.

According to some examples, the method includes determining whether to block transmission of the remote action data to the remotely accessible device at operation 708. In some embodiments, the apparatus 200 determines whether to block transmission of the remote action data based at least in part on the malicious determination data. For example, in some embodiments, the apparatus 200 determines to blocks transmission of the remote action data in a circumstance where the malicious determination data indicates that the remote action data is malicious. Additionally or alternatively, in some embodiments, the apparatus 200 determines that the transmission should not be blocked in a circumstance where the malicious determination data indicates that the remote action data is not malicious.

According to some examples, the method optionally includes facilitating transmission of the remote action data based at least in part on the malicious determination data at optional operation 710. In some embodiments, the apparatus 200 facilitates transmission of the remote action data only in a circumstance where the transmission of the remote action data is not blocked. In some embodiments, for example, the apparatus 200 proceeds with transmission to the remotely accessible device over one or more communications network in a circumstance where the transmission is not blocked. Additionally or alternatively, in some embodiments where the apparatus 200 blocks the transmission of the remote action data, the apparatus 200 facilitates transmission of the remote action data to the remotely accessible device in response to receiving data revoking the block, as described herein.

According to some examples, the method optionally includes generating an audit log based at least in part on the received copied data at optional operation 712. In some embodiments, the apparatus 200 generates a plurality of audit logs. In some embodiments, the audit log indicates or otherwise includes data embodying, associated with, or derived from a received request to initiate a remote access action for transmission of remote action data to a remotely accessible device. In some embodiments, for example, the apparatus 200 generates an audit log including data describing a remote access action initiated, data identifying or embodying the remote action data associated with the remote access action, data identifying the remotely accessible device to which the remote action data is to be transferred, data indicating results of a maliciousness determination (e.g., represented by malicious determination data), data indicating whether completion of a remote access action was blocked (e.g., whether transmission of the remote action data to the remotely accessible device was blocked), whether a notification was sent associated with a particular initiated remote access action, response data associated with a notification sent associated with a particular initiated remote access action, and/or the like.

According to some examples, the method optionally includes causing rendering of a user interface depicting a video of recorded display data across a defined timeseries at optional operation 714. In some embodiments, the user interface is configured based at least in part on the initiated copy action. For example, in some embodiments, the apparatus 200 records or causes recording of a display of the client device that initiated the remote access action. In some such embodiments, the apparatus 200 generates the video of the recorded display data from the client device. In other embodiments, the apparatus 200 receives the video of the recorded display data from the client device in response to the initiation of the remote access action.

The video of recorded display data may span a particular defined timeseries. In this regard, the video may include a frame or portion of video at each timestamp in the defined timeseries across a particular span of time. In some embodiments, the apparatus 200 causes rendering of the user interface including one or more specially configured interface element(s) indicating a time within the defined timeseries at which the remote access action was initiated. In some embodiments, the interface element is configured to receive user engagement, wherein the user interface is dynamically updated to jump to the portion of the video corresponding to a particular timestamp in the defined timeseries in response to such user engagement. For example, in some embodiments, the user interface depicts the video of recorded display data across the defined timestamp, and is specially configured to indicate a point in the defined timeseries at which the remote action was initiated. Additionally or alternatively, in some embodiments, the apparatus 200 automatically configures the user interface to seek to a particular point in the defined timeseries, for example based at least in part on a timestamp associated with the initiated remote access action via the client device.

Figure 8:
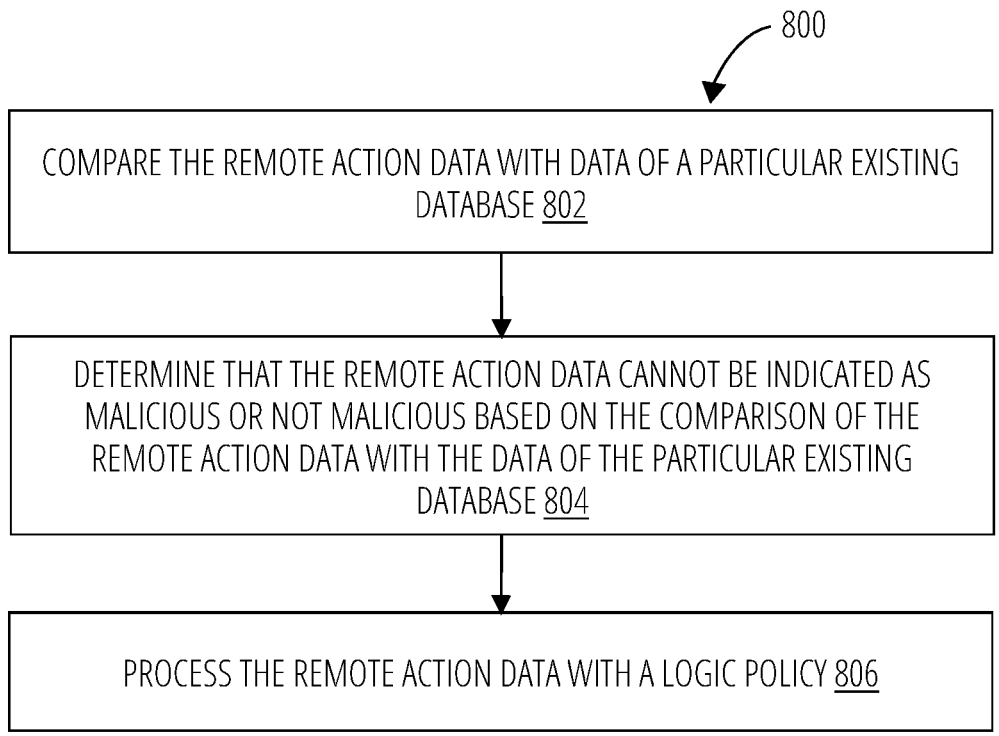
FIG. 8 illustrates a flowchart depicting operations of an example process for generating malicious determination data, for example as part of an example process for improved remote access operations, in accordance with at least one example embodiment of the present disclosure.

FIG. 8 illustrates a flowchart depicting operations of an example process for generating malicious determination data, for example as part of an example process for improved remote access operations, in accordance with at least one example embodiment of the present disclosure. Specifically, FIG. 8 depicts an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one external data repository, templating system, and/or the like, to perform one or more of the operation(s) as depicted and described. For purposes of simplifying the description, the process 800 is described as performed by and from the perspective of the apparatus 200.

In some embodiments, the process 800 embodies a sub-process of one or more other process as depicted and described herein. For example, in some embodiments, the process 800 embodies a sub-process for generating malicious determination data. In this regard, in some embodiments the process 800 begins after one or more of the blocks of the process 700, for example after block operation 704. Additionally or alternatively, in some embodiments, one or more blocks of the process 800 replace one or more blocks of the other process, for example by replacing, supplanting, supplementing, and/or otherwise embodying an instance of block operation 706. Additionally or alternatively, in some embodiments, flow returns to the other process upon completion of the process 800, for example proceeding to block operation 708 upon completion of the process 800.

Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

According to some examples, the method includes comparing the remote action data with data of a particular existing database at operation 802. In some embodiments, the apparatus 200 determines a particular existing database with which to retrieve data for comparison with the remote action data. In some embodiments, the apparatus 200 determines that the remote action data is malicious in response to detecting a match between the remote action data and at least one data record of the particular existing database. For example, in some embodiments, the apparatus 200 determines a data type associated with the remote action data and/or corresponding to the initiated remote access action. In some such embodiments, the apparatus 200 determines whether the remote action data embodies or includes clipboard text data, and/or whether the remote action data embodies or includes copied file data. In a circumstance where the apparatus 200 determines that the remote action data embodies or includes clipboard text data, the apparatus 200 compares the remote action data with data of a text database. In a circumstance where the apparatus 200 determines that the remote action data embodies or includes copied file data, the apparatus 200 compares the remote action data with data from a file database.

According to some examples, the method includes determining that the remote action data cannot be indicated as malicious or not malicious at operation 804. For example, in some embodiments, the apparatus 200 determines that the remote action data cannot be indicated as malicious or not malicious based on the comparison of the remote action data with the data of the particular existing database. In some embodiments, for example where the remote action data is not detected in the existing database, the apparatus 200 may determine that the remote action data cannot be indicated as malicious. Additionally or alternatively, in some embodiments, the apparatus 200 compares the remote action data data with the data in the existing database that includes known non-malicious data, and if no match is detected, the apparatus 200 determines that the remote action data cannot be indicated as not malicious. Additionally or alternatively, in some embodiments, the apparatus 200 performs a first algorithm and/or sub-process to determine that the remote action data cannot be indicated as malicious, and a second algorithm and/or sub-process to determine that the remote action data cannot be indicated as not malicious.

According to some examples, the method includes processing the remote action data with a logic policy at operation 806. In some embodiments, the apparatus 200 determines, retrieves, and/or otherwise identifies the logic policy for use corresponding to the particular remote action data. For example, in some embodiments, the apparatus 200 identifies a particular logic policy corresponding to the remote action data based at least in part on the remote action data itself, an identifier corresponding to the remotely accessible device to which the remote action data is to be transmitted, a location identifier corresponding to the remotely accessible device, an entity identifier corresponding to the remotely accessible device, and/or the like. In some embodiments, the logic policy defines a default set of logic statement(s) that are usable to determine whether an initiated remote access action associated with transmission of the particular remote action data is malicious or not malicious. In some such embodiments, the apparatus 200 continues processing based at least in part on the resulting malicious determination data, for example generated utilizing the logic policy.

Figure 9:
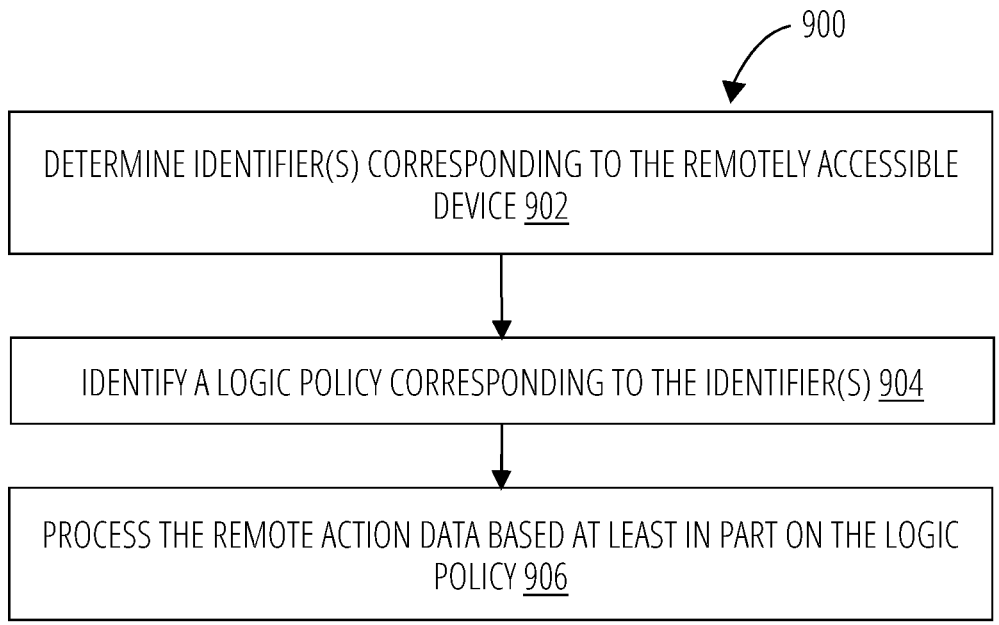
FIG. 9 illustrates a flowchart depicting operations of an example process for identifying a logic policy for generating malicious determination data, for example as part of an example process for improved remote access operations, in accordance with at least one example embodiment of the present disclosure.

FIG. 9 illustrates a flowchart depicting operations of an example process for identifying a logic policy for generating malicious determination data, for example as part of an example process for improved remote access operations, in accordance with at least one example embodiment of the present disclosure. Specifically, FIG. 9 depicts an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one external data repository, templating system, and/or the like, to perform one or more of the operation(s) as depicted and described. For purposes of simplifying the description, the process 900 is described as performed by and from the perspective of the apparatus 200.

In some embodiments, the process 900 embodies a sub-process of one or more other process as depicted and described herein. For example, in some embodiments, the process 900 embodies a sub-process for identifying a particular logic policy for use in generating malicious determination data. In this regard, in some embodiments the process 900 begins after one or more of the blocks of the process 800, for example after block operation 804. Additionally or alternatively, in some embodiments, one or more blocks of the process 900 replace one or more blocks of the other process, for example by replacing, supplanting, supplementing, and/or otherwise embodying the blocks of the process 800. Additionally or alternatively, in some embodiments, flow returns to the other process upon completion of the process 900, for example proceeding to block operation 806 upon completion of the process 900.

Although the example process 900 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

According to some examples, the method includes determining identifier(s) corresponding to the remotely accessible device at operation 902. For example, in some embodiments, the apparatus 200 determines a device identifier corresponding to the remotely accessible device to which the remote action data is to be transmitted. Additionally or alternatively, in some embodiments, the apparatus 200 determines data embodying a site location corresponding to the remotely accessible device. Additionally or alternatively, in some embodiments, the apparatus 200 determines an enterprise identifier corresponding to the remotely accessible device to which the remote action data is to be transmitted. In some embodiments, the apparatus 200 automatically determines one or more of the identifier(s) as a predetermined data value. Additionally or alternatively, in some embodiments, the apparatus 200 dynamically determines one or more of the identifier(s) based at least in part on the request and/or other data received associated with initiation of the remote access action and/or processing of the remote action data.

According to some examples, the method includes identifying a logic policy corresponding to the identifier(s) at operation 904. In some embodiments, the apparatus 200 maintains a database, lookup table, and/or other structure that maps one or more logic policy to one or more identifier(s). In this regard, in some embodiments the apparatus 200 utilizes one or more of the identifier(s), for example determined at operation 902, as a key to retrieve a corresponding at least one logic policy from a data structure accessible to and/or maintained by the apparatus 200.

According to some examples, the method includes processing the remote action data based at least in part on the logic policy at operation 906. In this regard, to process the remote action data based at least in part on the logic policy, in some embodiments the apparatus 200 executes the logic policy based at least in part on the remote action data and/or data associated therewith. In some embodiments, the logic policy includes executable computing logic that is executed by the apparatus 200. For example, in some embodiments, the apparatus 200 executes one or more data-driven comparisons and/or checks defined in the logic policy. Such sub-process(es) may compare particular data values associated with the remote action data, initiated remote access action, remotely accessible device associated therewith, and/or the like, to perform one or more of the computing logic process(es) defined in the logic policy. In some embodiments, the logic policy is specific to a particular remotely accessible device, a particular type of remotely accessible device, a particular site location including any number of remotely accessible device, and/or a particular enterprise identifier (e.g., where all remotely accessible devices owned or otherwise associated with a particular enterprise are subject to the same restrictions on remote access).

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving remote action data from a client device in response to an initiated remote access action of the remote action data from the client device to a remotely accessible device;
    quarantining the remote action data from the client device;
    generating malicious determination data indicating whether the remote action data is determined as malicious by processing the remote action data;
    determining whether to block transfer of the remote action data to the remotely accessible device based at least in part on the malicious determination data; and
    causing rendering of a user interface depicting a video of recorded display data across a defined timeseries, wherein the user interface is specially configured to indicate a point in the defined timeseries at which the remote access action was initiated.

2. The computer-implemented method of claim 1, wherein determining whether to block the transfer of the remote action data to the remotely accessible device based at least in part on the malicious determination data comprises:
    determining that the malicious determination data indicates that the remote action data is not malicious; and
    in response to the determination, automatically transmitting the remote action data to the remotely accessible device.

3. The computer-implemented method of claim 1, wherein determining whether to block the transfer of the remote action data to the remotely accessible device based at least in part on the malicious determination data comprises:
    determining that the malicious determination data indicates that the remote action data is malicious; and
    in response to the determination, automatically blocking transmission of the remote action data to the remotely accessible device.

4. The computer-implemented method of claim 3, further comprising:
    transmitting a notification to an administrator device that indicates that the transmission of the remote action data was blocked.

5. The computer-implemented method of claim 4, wherein the notification is engageable to revoke the blocking transmission of the remote action data to the remotely accessible device.

6. The computer-implemented method of claim 1, wherein generating the malicious determination data comprises:
    determining a site location associated with the remotely accessible device;
    identifying a logic policy corresponding to the site location; and
    processing the remote action data based at least in part on the logic policy.

7. The computer-implemented method of claim 1, wherein generating the malicious determination data comprises:
    identifying a logic policy corresponding to the remotely accessible device; and
    processing the remote action data based at least in part on the logic policy.

8. The computer-implemented method of claim 1, wherein generating the malicious determination data comprises:
    determining an enterprise identifier corresponding to the remotely accessible device;
    identifying a logic policy corresponding to the enterprise identifier; and
    processing the remote action data based at least in part on the logic policy.

9. The computer-implemented method of claim 1, further comprising:
    generating an audit log comprising data indicative of at least a timestamp associated with the initiated remote access action, the client device, and the remotely accessible device.

10. The computer-implemented method of claim 1, wherein processing the remote action data comprises:
    comparing the remote action data with a file database.

11. The computer-implemented method of claim 1, wherein processing the remote action data comprises:
    applying the remote action data to a rules set.

12. The computer-implemented method of claim 1, wherein processing the remote action data comprises:
    applying the remote action data to a maliciousness heuristics model.

13. The computer-implemented method of claim 1, wherein the remote action data comprises a file copied from the client device.

14. The computer-implemented method of claim 1, wherein the remote action data comprises clipboard text data copied from the client device.

15. The computer-implemented method of claim 14, wherein processing the remote action data comprises:
determining that the clipboard text data represents malicious code or malicious text.

16. The computer-implemented method of claim 1, wherein the remotely accessible device comprises an operational technology device.

17. The computer-implemented method of claim 1, further comprising:
causing rendering of a user interface depicting a video of recorded display data across a defined timeseries; and
automatically configuring the user interface to seek to a particular point in the defined timeseries based at least in part on a timestamp associated with the initiated remote access action.

18. An apparatus comprising:
at least one processor; and
at least one memory storing instructions that, when executed by the at least one processor, configure the apparatus to:
receive remote action data from a client device in response to an initiated remote access action of the remote action data from the client device to a remotely accessible device;
quarantine the remote action data from the client device;
generate malicious determination data indicating whether the remote action data is determined as malicious by processing the remote action data;
determine whether to block transfer of the remote action data to the remotely accessible device based at least in part on the malicious determination data; and
cause rendering of a user interface depicting a video of recorded display data across a defined timeseries, wherein the user interface is specially configured to indicate a point in the defined timeseries at which the remote access action was initiated.

19. At least one non-transitory computer-readable storage medium, the computer-readable storage medium including instructions that when executed by at least one computer, configures the at least one computer to:
receive remote action data from a client device in response to an initiated remote access action of the remote action data from the client device to a remotely accessible device;
quarantine the remote action data from the client device;
generate malicious determination data indicating whether the remote action data is determined as malicious by processing the remote action data;
determine whether to block transfer of the remote action data to the remotely accessible device based at least in part on the malicious determination data; and
cause rendering of a user interface depicting a video of recorded display data across a defined timeseries, wherein the user interface is specially configured to indicate a point in the defined timeseries at which the remote access action was initiated.

* * * * *